United States Patent
Chow et al.

(10) Patent No.: US 12,498,907 B2
(45) Date of Patent: Dec. 16, 2025

(54) METHOD, SYSTEM AND COMPUTER-READABLE MEDIUM FOR INTEGRATING A BACKEND-AS-A-SERVICE WITH AN ONLINE SERVICE

(71) Applicants: Chung-Man Abelard Chow, Markham (CA); Ming Chen, Markham (CA); Jieshui Mo, Ottawa (CA)

(72) Inventors: Chung-Man Abelard Chow, Markham (CA); Ming Chen, Markham (CA); Jieshui Mo, Ottawa (CA)

(73) Assignee: HUAWEI CLOUD COMPUTING TECHNOLOGIES CO., LTD., Gui'an New Disctrict (CN)

( * ) Notice: Subject to any disclaimer, the term of this patent is extended or adjusted under 35 U.S.C. 154(b) by 496 days.

(21) Appl. No.: 17/895,780

(22) Filed: Aug. 25, 2022

(65) Prior Publication Data
US 2022/0413812 A1    Dec. 29, 2022

Related U.S. Application Data

(63) Continuation of application No. PCT/CN2020/076517, filed on Feb. 25, 2020.

(51) Int. Cl.
*G06F 8/35*     (2018.01)
*G06F 8/71*     (2018.01)
(Continued)

(52) U.S. Cl.
CPC ............ *G06F 8/35* (2013.01); *G06F 8/71* (2013.01); *G06F 9/547* (2013.01); *H04L 67/34* (2013.01)

(58) Field of Classification Search
CPC ... G06F 8/35; G06F 8/71; G06F 9/547; H04L 67/34; H04L 67/02; H04L 67/125; H04L 67/10
See application file for complete search history.

(56) References Cited

U.S. PATENT DOCUMENTS 11,269,889 B1 *   3/2022   Aversano ............ G06F 16/2458
11,372,634 B1 *   6/2022   Gabrielson ......... H04L 67/1031
(Continued)

FOREIGN PATENT DOCUMENTS

CN      103312812 A      9/2013
CN      105610923 A      5/2016
(Continued)

*Primary Examiner* — Marina Lee

(57) ABSTRACT

A method, system, and computer-readable medium for enabling a client application to access an online service, such as an online AI service, without requiring the developer of the client application to fully understand the interface contract of the online service and write software code integrating the client application directly with the interface of the online service. In one aspect, the interface contract of the online service is automatically analyzed, and the client application developer is presented with options for configuring the mapping of data fields between the client application or client application database and the online service. Based on the developer's configuration choices, software code is automatically generated for exchanging data between the client application or client application database and the online service. Trigger conditions for the software code may be changes in the database state, predefined events, or requests received from the client application.

14 Claims, 8 Drawing Sheets

(51) Int. Cl.
*G06F 9/54* (2006.01)
*H04L 67/00* (2022.01)

(56) References Cited

U.S. PATENT DOCUMENTS

| | | | |
|---|---|---|---|
| 11,652,652 B2 * | 5/2023 | Craggs | H04M 15/06 |
| | | | 709/223 |
| 2015/0040016 A1 | 2/2015 | Jindal et al. | |
| 2017/0031585 A1 | 2/2017 | Jindal et al. | |
| 2017/0279928 A1 * | 9/2017 | Mokeev | G06F 8/60 |
| 2018/0121187 A1 * | 5/2018 | Jain | H04L 67/34 |
| 2018/0300115 A1 * | 10/2018 | Grebenshikov | G06Q 30/0641 |
| 2019/0364096 A1 | 11/2019 | Li | |
| 2020/0287947 A1 * | 9/2020 | Korhonen | H04N 21/4312 |
| 2021/0124800 A1 * | 4/2021 | Williams | G06F 40/295 |

FOREIGN PATENT DOCUMENTS

| | | |
|---|---|---|
| CN | 106464736 A | 2/2017 |
| CN | 107222542 A | 9/2017 |
| CN | 107534586 A | 1/2018 |
| CN | 109074265 A | 12/2018 |
| CN | 109754090 A | 5/2019 |

* cited by examiner

METHOD, SYSTEM AND COMPUTER-READABLE MEDIUM FOR INTEGRATING A BACKEND-AS-A-SERVICE WITH AN ONLINE SERVICE

CROSS-REFERENCE TO RELATED APPLICATION

This application is a continuation of PCT International Application No. PCT/CN2020/076517, filed Feb. 25, 2020, titled METHOD, SYSTEM AND COMPUTER-READABLE MEDIUM FOR INTEGRATING A BACKEND-AS-A-SERVICE WITH AN ONLINE SERVICE, the contents of which are hereby expressly incorporated into the present application by reference in their entirety.

TECHNICAL FIELD

The present disclosure relates to techniques for a backend-as-a-service of a cloud computing platform. In particular the present disclosure relates a techniques for a backend-as-a-service to generate software code which enables a client application to interact with the backend-as-a-service to access an online service using a RESTful application program interface (API) provided by the online service-service of a cloud computing platform.

BACKGROUND

Cloud computing is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g. processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis.

Online services provide RESTful APIs over the HTTP or HTTPS protocol. A REST (REpresentational State Transfer) or RESTful API uses HTTP or HTTPS requests to GET, PUT, POST, and DELETE data over the World Wide Web. RESTful Web services are typically stateless: no state information is stored by the RESTful service itself, leaving the client responsible for storing all state information (such as session data). Online services includes a software application that provide RESTful APIs that runs a webserver, which runs on a physical machine or a virtual machine.

Client applications (i.e., software applications running on client computing devices) can access a RESTful API provided by the online service. An online service typically includes an interface contract that describes the RESTful APIs. The interface contract defines and specifies inputs and outputs of RESTful APIs for interacting with the online service. However, in some technology areas, especially new and emerging technology areas like artificial intelligence, RESTful APIs provided by online services are not standardized. Due to the lack of standards governing RESTful APIs provided by online services, the interface contract for each online service is different. Without a standard for interface contracts, for example, there is no standard for the data format required to access and exchange data with RESTful APIs provided by various online services. To use a given online service in software application development, the application developer must have sufficient skill and expertise to analyze, understand, and integrate software code using the interface contract of the given online service that the software application intends to use. This problem is further exacerbated by the fact that new technology areas are also likely to suffer from a shortage of application developers with sufficient skill and experience in that technology area.

SUMMARY

The present disclosure provides a method, system and processor readable medium for a backend-as-a-service (generally known and referred to hereinafter as a backend service) of a cloud computing platform to generate software code to facilitate a client application access to an online service. The backend service enables a client application running on a client device to interact with the backend service to access an online service using a RESTful application program interface (API) (e.g., a non-standardized HTTP-based RESTful API) provided by the online service. In other words, a software developer of the client application is not required to fully understand an interface contract of the online service or write software code based on the interface contract of the online service in order to enable the client application to access the online service using the RESTful API provided by the online service.

The method described in the present disclosure may exhibit one or several advantages over existing techniques for enabling access to online services described above. First, the method may eliminate the need for the software developer of the client application to understand the interface contract of an online service in order for the client application to use the Restful API provided by the online service. Second, the method may allow the software developer of the client application to write one set of software functions and use the set of software functions to interface with different Restful APIs provided by multiple different online services. Third, the method may reduce the risk of programming errors by providing a simplified user-interface to a client device used by the software developer of the client application and by generating the software code used to interface with Restful API provided by the online service. Fourth, the method may alert the software developer of the client application to changes in the interface contract of an online service currently being used by the client application. Fifth, the method may allow the client application to handle only those portions of the online service output data that are of interest to the client application, thereby reducing the amount of data that needs to be handled by the client application. Sixth, the method may reduce or eliminate the need for the client application to handle database access related to sending requests to the online service or storing responses from the online service. Seventh, the method may reduce or eliminate the need for the client application to handle monitoring the database state for updates which may trigger the need to for the client application to access the online service. Eighth, the method may reduce or eliminate the need for the client application to handle monitoring for events which may trigger the need for the client application to access the online service. Further prospective advantages and technical effects may be evident from this disclosure.

In accordance with a first aspect of the present disclosure, there is provided a method performed by a backend service of a cloud computing platform. The backend-as-a-service receives, from the online service, an interface contract for the online service. The backend service generates configuration options based on an introspection of the interface contract. The backend service sends the configuration options to a developer device associated with a software developer of a client application. The backend service receives, from the developer device, configuration data. The backend service generates software code based on a representation of a RESTful API provided by the online service and the configuration data received from the developer device. The representation of the RESTful API provided by the online service is generated based on an introspection of the interface contact 320 for the online service. The generated software code includes executable instructions, which when executed by the backend service, enables the client application to interact with the backend service 124 to access the online service using the RESTful API provided by the online service. In some aspects, the RESTful API provided by the online service is a non-standardized HTTP-based RESTful API.

In accordance with the preceding aspect, the method further includes, executing, by the backend service, the executable software instructions of the software code in response to detecting a trigger condition. Execution of the software instructions by the backend service causes the backend service to: send an online service query to the online service; receive an online service response from the online service; and, send client data to a client data recipient, the client data being based at least in part on the online service response.

In accordance with the preceding aspect, the configuration options comprises a plurality of options for mapping one or more client data fields of the client data to one or more online service data fields of the online service. Providing data field mapping options to the developer device may realize one or more of the advantages listed above, such as simplifying the user interface presented on the developer device or reducing programming errors.

In accordance with any of preceding aspects, the configuration data comprises a map of the one or more client data fields of the response data to the one or more online service data fields of the online service. Receiving data field mapping choices from the developer may realize one or more of the advantages listed above, such as simplifying the at least one of user interface and reducing programming errors.

In accordance with any of the preceding aspects, the response data comprises flattened version of the online service response. Flattening the online service output data (i.e. response data) may reduce the amount of data that the client application needs to handle by filtering out portions of the online service output data that are not pertinent to the client application.

In accordance with any of the preceding aspects, the client data recipient is a client application database. This may reduce or eliminate the need for the client application to handle database access logic for storing data from the online service.

In accordance with any of the preceding aspects of the present disclosure, the online service query sent to the online service is based at least in part on client data retrieved from the client application database. This may reduce or eliminate the need for the client application to handle database access logic for retrieving data to send to the online service.

In accordance with some of the preceding aspects, the trigger condition is based at least in part on database operations performed on the client application database. This may reduce or eliminate the need for the client application to handle monitoring database operations performed on the database for updates to the database that can trigger the need to access the online service.

In accordance with some of the preceding aspects, the trigger condition is determined based at least in part on an event. This may reduce or eliminate the need for the client application to handle monitoring for events triggering the need to access the online service.

In accordance with some of the preceding aspects, the event is based at least in part on the configuration data. Allowing the developer to define one or more events that trigger execution of the software code by the backend service may allow application-specific flexibility in managing the events giving rise to the need to access the online service.

In accordance with some of the preceding aspects, the client data recipient is a client application. This may grant greater control and flexibility to developers who wish to have the client application manage the database and programming logic itself.

In accordance with any of the preceding aspects, the online service query sent to the online service is based at least in part on data received from the client application. This may grant greater control and flexibility to developers who wish to have the client application more directly manage the content of requests sent to the online service without the need for a database.

In accordance with any preceding aspect, the online service comprises an artificial intelligence (AI) online service. This may provide the various advantages listed above in relation to AI online services, which tend to have non-standardized Restful APIs as discussed above.

In accordance with any preceding aspect, the online service provides a representational state transfer (REST) application program interface (API). This may provide the various advantages listed above in relation to online services having stateless RESTful APIs, which ordinarily require state data to be stored and managed by the client application.

In accordance with a second further aspect of the present disclosure, there is provided a computer-readable medium comprising instructions which, when executed by a processor, cause the processor to perform any of the methods set out above.

DESCRIPTION OF EXAMPLE EMBODIMENTS

Figure 1:
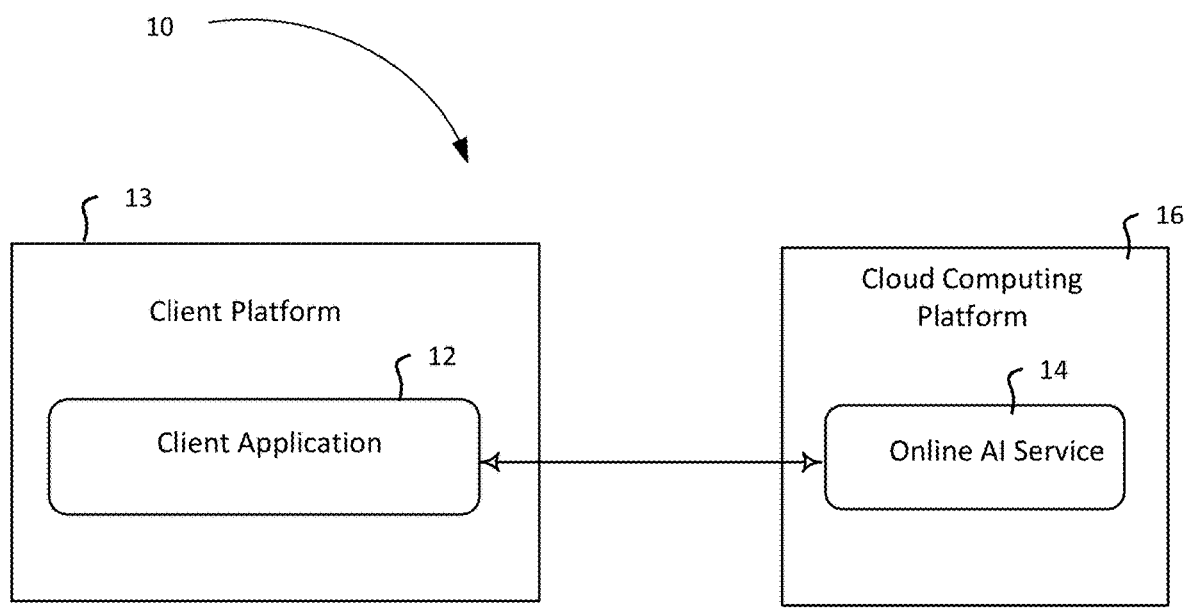
FIG. 1 is a block diagram of a conventional configuration of a client application directly accessing a cloud-based online service.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

FIG. 1 shows an example block diagram of a conventional architecture 10 for a client application 12 running on a client device 13 accessing an online service 14 hosted on a server 16. The client application 12 directly accesses the online service 14 running on the server 16 through Restful APIs provided by the online service 14. This requires the developer of the client application 12 to understand the interface contract of the online service and to write code to access the online service 14 through the Restful APIs provided by the online service 14.

The present disclosure provides example methods, processor readable medium, systems, and devices for a backend-as-a-service of a cloud computing platform to automatically generate code to facilitate a client application access to an online service so as to enable client applications access to the online service using a non-standardized HTTP-based RESTful application program interface (API). Advantageously, the method of the present disclosure does not require a software developer of a client application, such as client application 12, to write code to enable the client application to access the online service 14 through the Restful APIs provided by the online service 14.

Figure 2:
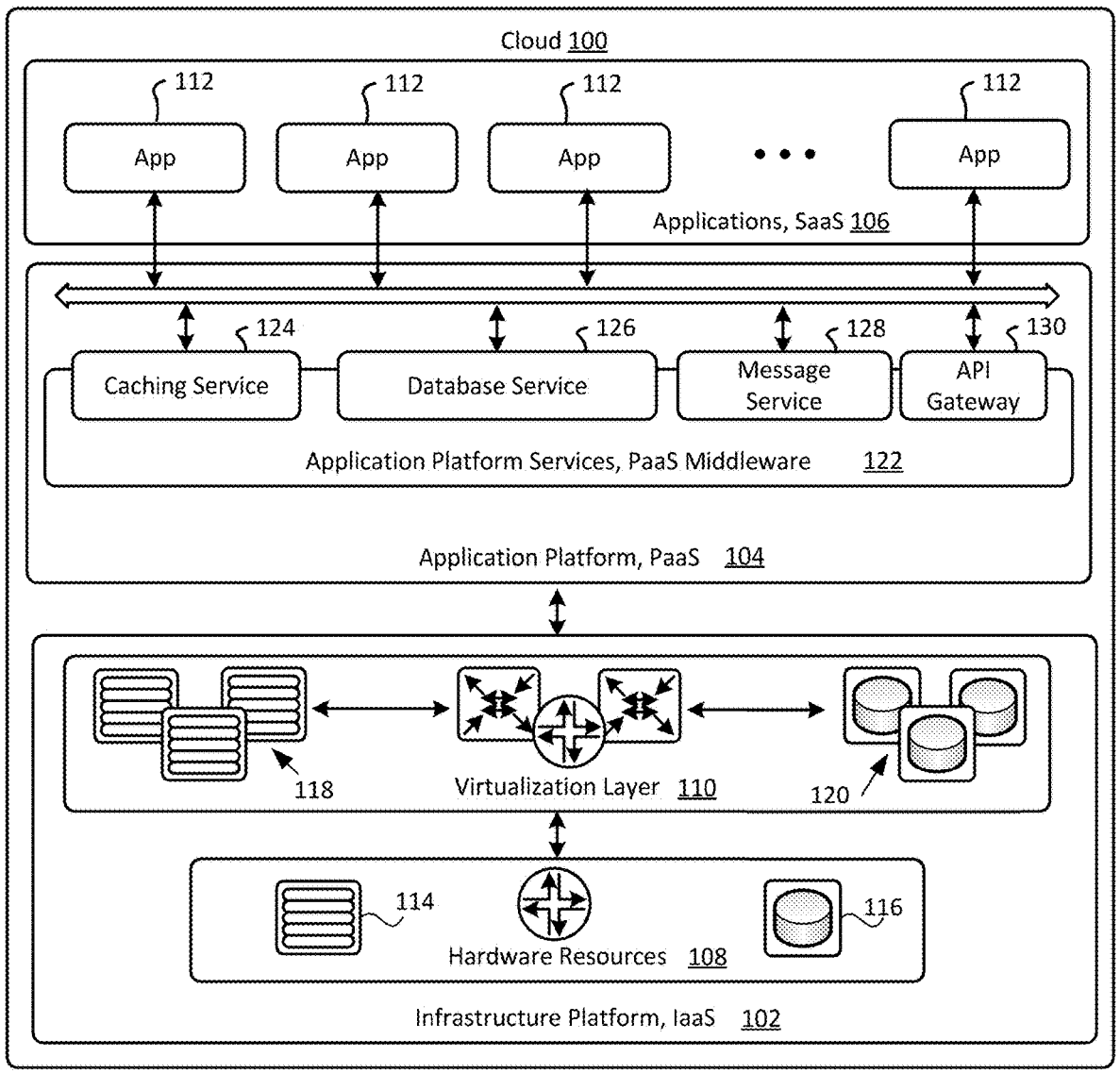
FIG. 2 is a block diagram illustrating a cloud computing architecture for delivering cloud computing services, according to some embodiments.

FIG. 2 is a logical block diagram schematically illustrating a cloud computing architecture that can deliver cloud computing services. The illustrated logical diagram of the cloud computing architecture 100 (referred to hereinafter as the cloud 100) generally comprises an infrastructure platform 102 (e.g. IaaS layer), an application platform 104 (e.g. PaaS layer), and applications 106 (e.g., SaaS layer). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines 114 that include processing resources (e.g., central processing units (CPUs), graphic processing units (GPUs), accelerators, tensor processing units (TPUs)), physical storage 116 that include storage resources such as memory (e.g., static random access memory (SRAM), dynamic random access memory (DRAM), synchronous DRAM (SDRAM), read-only memory (ROM), persistent storage devices (e.g. hard disk drives, optical drives, or a combination thereof), and networking resources (not shown) that are generally resident within a data center. A data center, as will be understood in the art, includes a collection of the physical hardware resources 108 (typically in the form of servers) that can be used as a collective computing resource comprising processing, storage, and networking resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

The virtualization layer 110 supports a flexible and efficient multi-tenancy run-time and hosting environment for applications 112 by providing Infrastructure as a Service (IaaS) facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 that may include an appropriate operating system and controlled access to virtualized storage resources 120.

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and networking resources) connected to each by connectivity resources. Virtualization may take the form of instantiating VMs 118 that, to another entity on a network and to software executed on the VM 118, is no different than a physical computing device. A VM 118 has its own set of computing resources (e.g. processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that a more recent development has been the use of containers in place of VMs 118. As mentioned above, each VM 118 typically includes its own operating system which typically increases redundant computing, storage, and connectivity resource usage.

Containers allow a single OS kernel to support a number of isolated applications. In place of a hypervisor that allows each VM 118 to run its own OS, a single OS hosts containers that are responsible for enforcing the resource isolation which otherwise would be provided by the VM 118.

The application platform 104 provides the capabilities for hosting applications 112 and includes application platform services 122. The application platform services 122 provide a set of middleware application services and infrastructure services to the applications 112 hosted on the application platform 104. Applications 112 hosted on the application platform 104 may run on either the VMs or the physical machines. In the embodiment depicted in FIG. 2, the application platform services 122 include a backend-as-a service 124. A backend-as-a-service 124 (hereinafter referred to as backend service 124) is a cloud service model in which developers outsource all the behind-the-scenes aspects of a web or mobile application so that they only have to write and maintain the frontend. Backend-as-a-service vendors provide pre-written software for activities that take place on servers, such as user authentication, database management, remote updating, and push notifications (for mobile apps), as well as cloud storage and hosting.

The application platform services 122 also includes a database-as-a-service 126 for providing a database to client applications, a message-as-a-service 128 for publishing messages to subscriber customers, and an application program interface (API) gateway-as-a-service that enables customers to create, publish, and maintain application program interfaces (APIs) to access other cloud services. It will be appreciated by those skilled in the art that the application platform services 112 may provide other middleware application services to customers, such as notifications-as-a-service, run-time-as-a-service, and the like. Applications 112 from customers may be deployed and executed within a respective VM 118, a container, or a physical machine 114.

Figure 3:
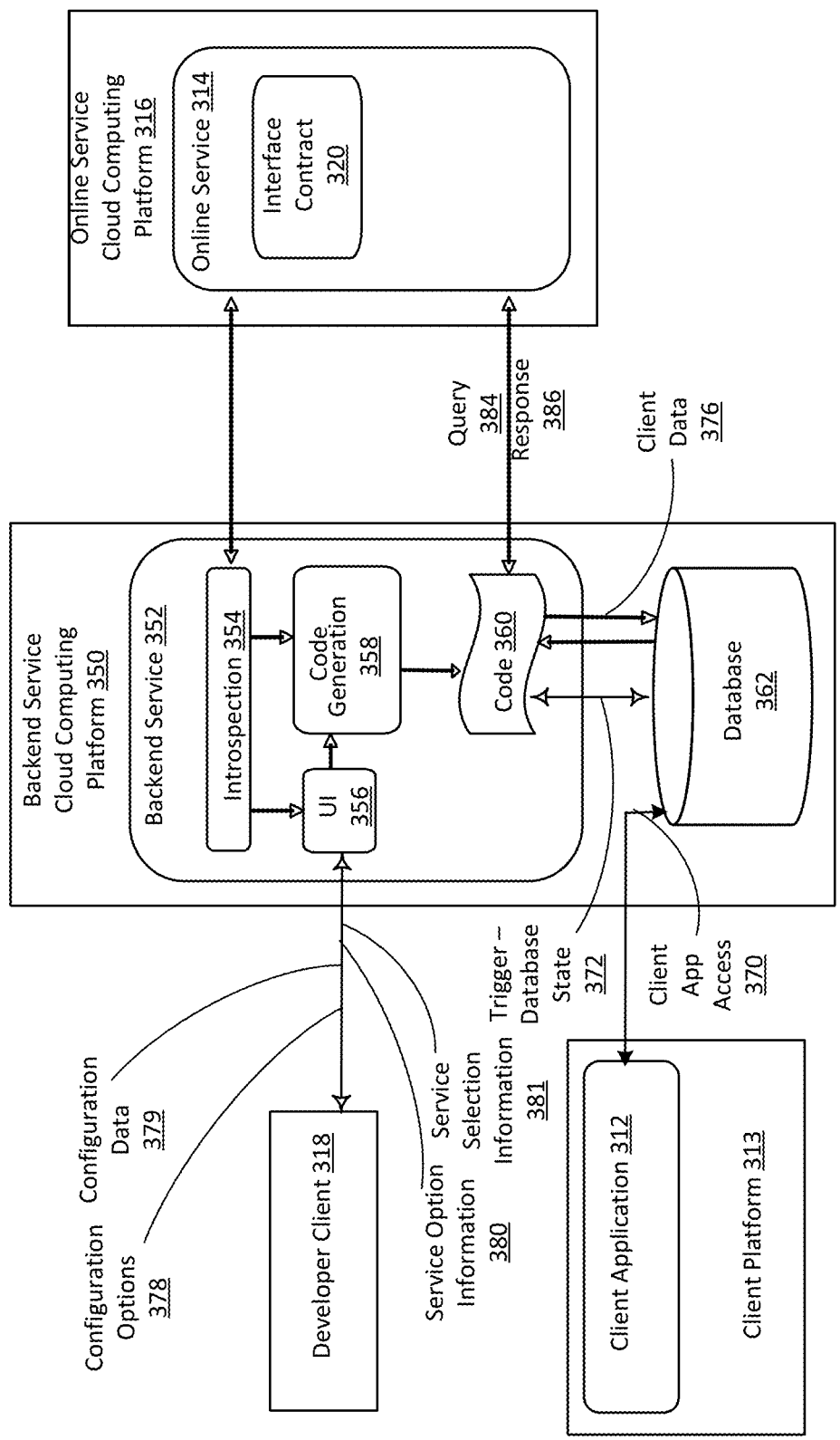
FIG. 3 is a block diagram of configuration of a client application accessing a cloud-based online service by means of a backend service with code triggered by a database condition in accordance with a first example embodiment of the present disclosure.

FIG. 3 shows a first example embodiment of the backend service 124 configured to automatically generate code which enables the client application 312 to interact with the backend-as-a-service 124 to access the online 314 service using a RESTful API provided by the online service 314. The backend service 124 is hosted on the cloud computing platform 100 as described above. The backend service 124 communicates with a client application 312 running on the client computing device 313 and a computing device 318 used by a software developer. The client application 312 may be a software application developed and maintained by the software developer using a computing device 318 (hereinafter referred to as developer device 318). The developer device 318 includes an integrated development environment (IDE) for writing code of the client application 312. The client application 312 may use one or more online services, in a similar manner as the client application 12 of FIG. 1. However, in the embodiment shown in FIG. 3, the client application 312 accesses an online service 314 via the backend service 124 as described herein.

The backend service 124 is also in communication with one or more online services, such as online service 314, running on server 316. The online service 314 may provide representational state transfer (RESTful) APIs. An interface contract 320 defines the RESTful APIs. The interface contract 320 may be stored, for example, as a swagger file, for communicating with, invoking, or using the online service 314. Alternatively, the interface contract 320 may be stored in another representation for communicating with, invoking, or using the online service 314. In some embodiments, the online service 314 is an online artificial intelligence (AI) service. An AI service is an AI model deployed on server 316 that provides a RESTful API. A feature of RESTful APIs provided by an online service 314 is an inferential/query characteristic, which is described in detail below.

The backend service 124 also communicates with a database 362 provided by the database-as-a-service 126 (otherwise known as a database service 126) of the cloud computing platform 100. In the illustrated embodiment shown in FIG. 3, the database 362 is hosted by the database-as-a service 126 of the cloud computing platform 100. However, in other embodiments other platforms may host the database 362. The backend service 124 communicates with the database 362 to store data in the database 362, retrieve data stored in the database 362, and modify data stored in the database 362. In the embodiment illustrated in FIG. 3, the client application 312 interacts with the database 362 by sending a client application access 370 to the backend service 124, which in turn sends the client application access 370 to the database 362. behalf of the client application 312.

The backend service 124 includes several functional modules, including an introspection module 354, a user-interface (UI) module 356, and a code generation module 358. The introspection module 354 is configured to send a request 382 to an online service 314 for an interface contract 320 and to receive a response 383 from the online service 314 that includes the interface contact 320.

The introspection module 354 is also configured to generate a representation of the Restful API provided by the online service 314 by introspecting (i.e., analyzing) the interface contract 320. The UI module 356 communicates with a browser of the IDE running on the developer device 318 to provide a simplified user-interface that enables the software developer of the client application 312 specify or input configuration options 378 for use by the code generation module 358 when generating software code 360 as in further detail below. The UI module 356 also communicates with the developer device 318 to receive the configuration data 379 receive configuration data 379 from the developer client 318. The developer device 318, using the browser, presents the configuration options 378 in the provided simplified user-interface to the software developer of the client application 312. The software developer, using an input device of by the developer device 318, selects one or more of the configuration options 378. The developer device 318 receives an indication of the one or more configuration options 378 selected by the software developer and generates configuration data 379 based on the one or more selected configuration options 378. The code generation module 358 receives the configuration data 379 from the UI module 356 and receives the representation of the Restful API from the introspection module 354. The code generation module 358 is configured to automatically generate software code 360 (hereinafter referred to as code 360) based on the representation of the Restful API received from the introspection module 354 and the configuration data 379 (e.g. data field mapping, trigger event configuration) received from the UI module 356. The code 360 includes instructions that are executable by the backend service 124. When the code 360 is executed by the backend service 124, the code 360 generates online service queries 384, sends the online service queries 384 to the online service 314, receives online service responses 386 from the online service 314, to processes the online service responses 386, and accesses the database 362. Execution of the code 360 by the backend service includes execution of the instructions of the code 360 by the backend service 124. In the illustrated embodiment, execution of the code 360 is triggered when a trigger condition occurs. In some embodiments, the trigger condition 372 occurs when a row is added to a database table stored in the database 362. The code 360 may access the database 362 to retrieve client data 376 from the database 362 or may access the database 362 to store response data 377 in the database 362. For the purposes of the present disclosure, the client data 376 is the data included in the online service query 384 and the response data 377 is the data included in the online service response 386. In some embodiments, the configuration data 379 includes a list of mapping information between columns of the database table stored in the database 362 and input and output attributes in an online service query 384 and online service response 386.

Figure 6:
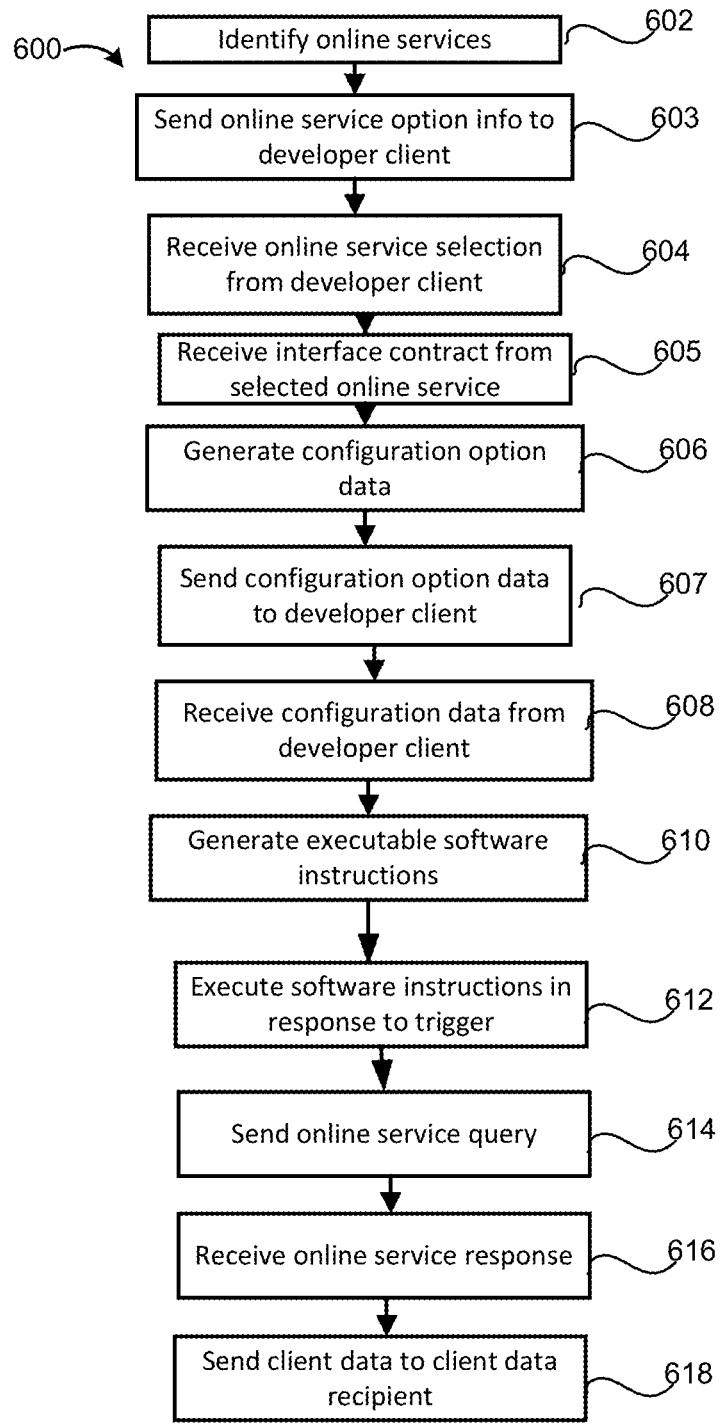
FIG. 6 is a flowchart showing the operation of a method for enabling access to an online service by a client application in accordance with example embodiments of the present disclosure.

FIG. 6 illustrates an example method 600 performed by the backend service 124 for enabling a client application, such as, client application 312, to interact with the backend service 124 to access an online service, such as online service 314. An engine, routines or subroutines of the software of the backend service 124 may carry out method 600. Coding of the engine, routines or subroutines of the software of the backend service 124 (or the software of the backend service 124) for carrying out method 600 is well within the scope of a person of ordinary skill in the art having regard to the present disclosure. Method 600 may include additional or fewer steps than shown and described, and may be performed in a different order. Computer-readable code of the software of the backend service 124 is executable on a virtual machine 118, executable on a physical machine 1114 of the cloud computing platform 100, or executable in a container 112 of the cloud computing platform 100.

At step 602, the backend service 124 retrieves the interface contract 320 from a selected online service 314. In some embodiments, the introspection module 354 of the backend service 124 retrieves the interface contract 320 and introspects (i.e., analyzes) the interface contract 320 in order to generate a representation of the Restful API provided by the online service 314. For example, the introspection module 354 may introspect the interface contract 320 to map out an input JSON (Javascript Object Notation) for the online service 314. In some embodiments, introspection module 354 introspects (i.e., analyzes) the REST API described in Interface Contract 320, then generates configuration options 378 based on input/request JSON of the REST API. Configuration options 378 include a list of attributes that need to map to the column in the database table stored in database 362.

At step 604, the UI module 356 of the backend service 124 generates configuration options 378 based on user interface metadata received from the introspection module 358. The configuration options 378 are indicative of various configuration options for configuring the backend service 124 to integrate the online service 314. In some embodiments, the configuration options 378 includes a plurality of options for mapping one or more client data fields of client data 376 to one or more online service data fields of the online service 314. In some embodiments, the configuration options 378 sets out the different JSON attributes of the RESTful API provided by the online service 314. In some embodiments, the introspection module 354 generates the user interface metadata using a recursive algorithm.

Figure 7:
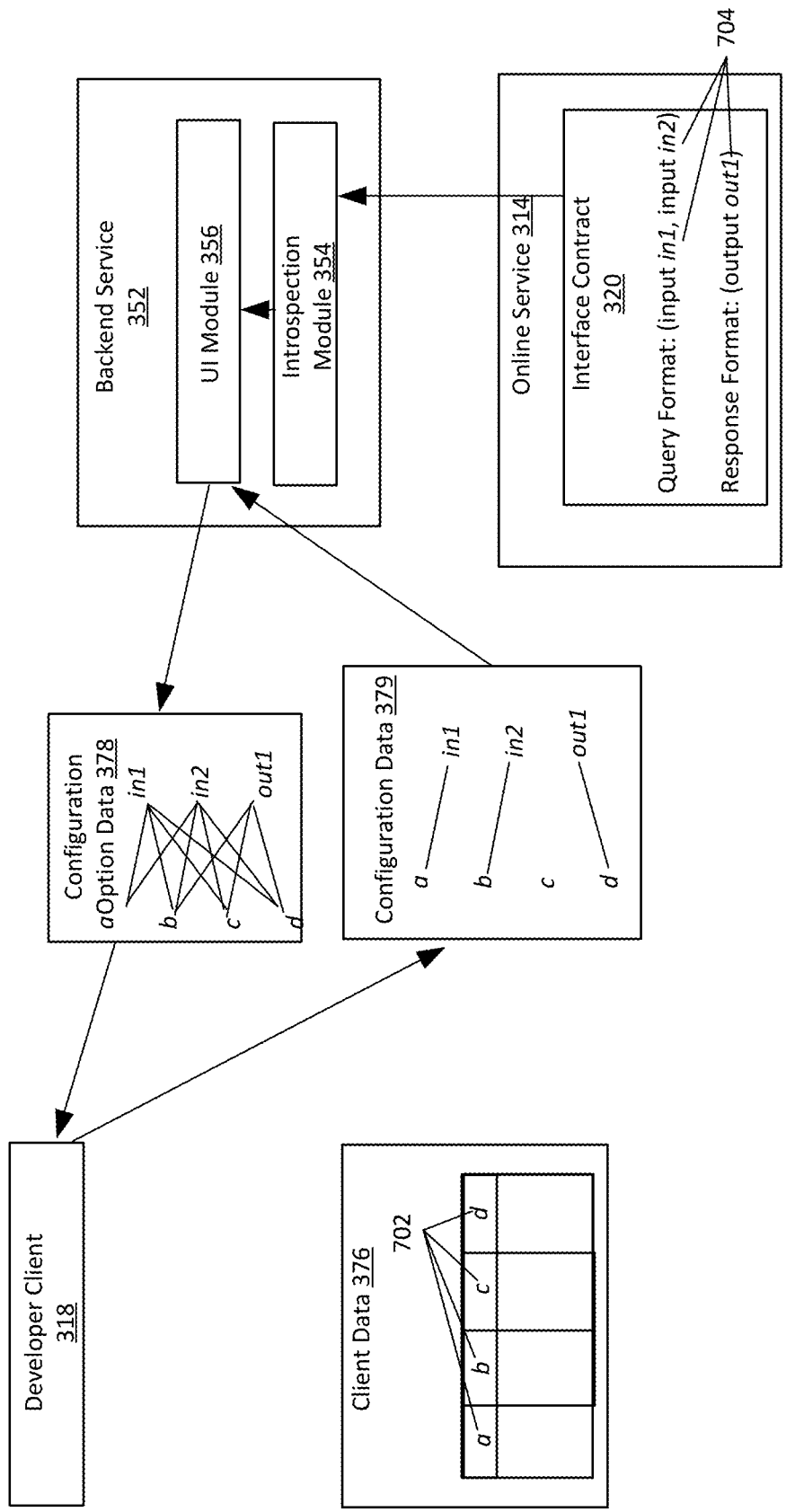
FIG. 7 is a block diagram showing an example configuration of a backend service mapping data fields of a client application to data fields of an online service in accordance with example embodiments of the present disclosure.

For example, in the example configuration scenario shown in FIG. 7, the online service 314 takes two online service data fields, in1 and in2, as inputs, and the online service 314 returns one online service data field, out1, as an output. The client application 312 uses four different client data fields of the client data 376 (e.g. four columns in the client application database 362 a, b, c, and d). In this example scenario, the configuration option data 378 corresponds to a plurality of options for matching client data fields (e.g. columns of the client application database 362 a, b, c, and d) to the various online service data fields (in1, in2, and out1).

At step 606, the introspection module 354 of the backend service 124 sends the configuration options 378 to the developer device 318 via the UI module 356. In some embodiments, the configuration options 378 allows the software developer of the client application 312 to input or specify a database column name for each JSON attribute derived from the interface contract 320. The browser of the developer device 318 may be changed dynamically based on the user interface metadata generated by the introspection module 354, with different input fields based on the inputs to the online service 314 defined in the interface contract 320. In the example configuration scenario shown in FIG. 7, the UI module 354 sends configuration options 378 to the developer device 318 in the form of data to a browser running on the developer device 318. The browser allows the software developer of the client application 312 to match client data fields (e.g. columns of the client application database 362 a, b, c, and d) to the various online service data fields (in1, in2, and out1).

At step 608, the UI module 354 receives configuration data 379 from the developer device 318. In some embodiments, the configuration data 379 includes a mapping scheme chosen by the software developer of the client application 312 to map one or more client data fields of the client data 376 to one or more online service data fields of the online service 314. In some embodiments, the configuration data 379 specifies database column names for each JSON attribute derived from the interface contract 320, and a database table for storing online service response 386 data. In the example configuration scenario shown in FIG. 7, the configuration data 379 is data mapping specific columns of a database table stored in the database 362 to specific online service data fields, as selected or configured by the software developer of the client application 312. For example, as shown, the software developer of the client application 312 has chosen to map a to in1, b to in2, and d to out1, as reflected in the configuration data 379 sent from the developer device 318 to the backend service 124. In a different, alternative configuration scenario (not shown), if the data types of the various data fields allowed such a mapping, the software developer of the client application 312 might choose to map a to in1, b to in2, and a two-element array (c, d) to out. Either of these two mappings could be represented in the configuration data 379 sent by the developer device 318 to the UI module 354.

In some embodiments, the configuration options 378, the configuration data 379, or both the configuration options 378 and the configuration data 379 may include information relating to other aspects of the backend service 124 other than mapping data fields between the client application 312 and the online service 314. For example, some embodiments may allow the software developer of the client application 312 to specify or manage the trigger conditions that trigger (i.e., cause) execution of the code 360, by defining database operations that trigger execution of the code 360. For example, a trigger condition may occur when a database operation to add a new record to the database 362 occurs. Alternatively, the software developer of the client application 312 may define events (referred to as client defined events 488 (see FIG. 4) that trigger execution of the code 360. Other types of configuration options 378, configuration data 379, or both configuration options 378 and configuration data 379 may be used in further embodiments.

At step 610, the code generation module 358 of the backend service 124 generates the code 360 based on the representation of the Restful API provided by the online service 314 generated by the introspection module 358 and the configuration data 379 received from the developer device 318 via the UI module 356. The code 360 implements the integration of the online service 314 into the backend service 124. When the code 360 is executed, the code 360 enables the client application to interact with the backend service (e.g., the database 370) to access the online service 314 using a RESTful API provided by the online service to facilitate access to the online service by the client application. The code 360 may, for example, implement the mapping of the client data fields to the online service data fields specified in the configuration data 379 by: defining how to construct online service queries 384 to the online service 314 using client data fields from the client data 376; and by defining how to parse online service responses 386 from the online service 314 and store or forward the online service data fields received in the online service responses 386 as various client data fields (e.g. in various columns of the client application database 362). In some embodiments, the code 360 is generated by combining code snippets generated based on the representation of the Restful API provided by the online service 314 and configuration data 379 with template code that can access the database 362 of the backend service 124. In some embodiments, the code 360 is generated by combining code snippets generated based on the representation of the Restful API provided by the online service 314 and configuration data 379 with template code that can interact with the event system 464 (shown in FIG. 4).

Figure 8:
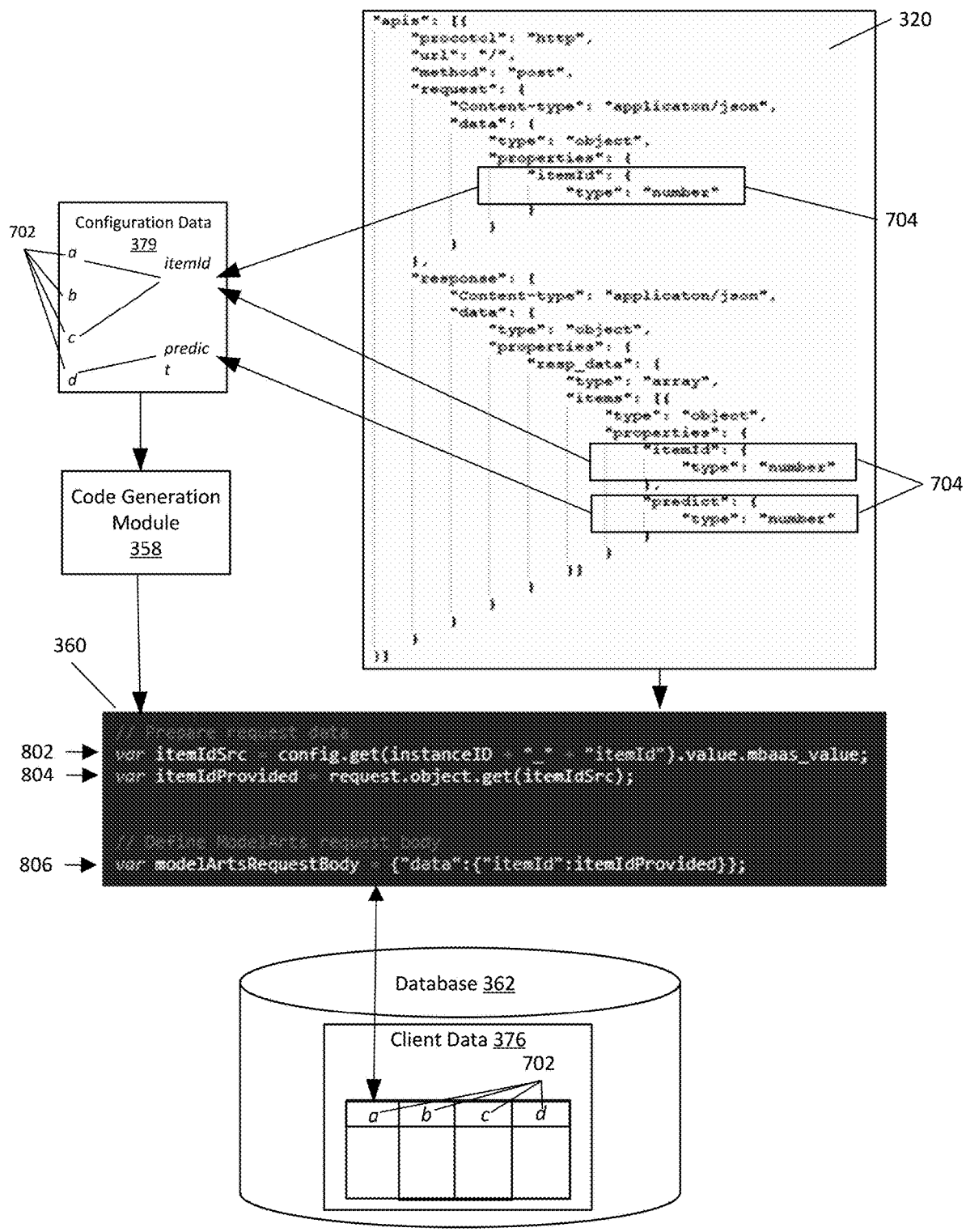
FIG. 8 is a block diagram showing automatic generation of code by a backend system in accordance with example embodiments of the present disclosure.

An example of the code 360 automatically generated by the code generation module 358 is shown in FIG. 8. The interface contract 320, retrieved from the online service 314 by the introspection module 354 defines a number of online service data fields 704, including the input itemId (a variable of data type number) and the outputs itemId (a variable of data type number) and predict (a variable of data type number). The interface contract 320 defines the RestFul APIs provided by the online service 314: it defines how to access the online service 314, including the protocol ("http"), url ("/"), method ("post"), request specification, and response specification for using or accessing the online service 314. The request specification identifies the content type of the request ("application/json"), and the data fields required to be part of the response (input itemId). The response specification identifies the content type of the request ("application/json"), and the data fields returned as part of the response (data of type object having the property resp data, resp data being an array having items itemId (type number) and predict (also type number)). In this example, both the input itemId and the outputs itemId and predict are identified as online service data fields 704.

The configuration data 379 received from the developer device 318 maps client data field 702 a to the online service data field itemId and client data field 702 d to the online service data field predict. Based on the configuration data 379 and the representation of the RESTful API provided by the online service 314, the code generation module 358 generates the code 360. In some embodiments, the code generation module 358 automatically generates the code 360 based on the configuration data 379 and the introspection of the interface contract 320. The first line 802 of code 360 identifies the client data field 702 a which is mapped to online service data field 704 itemId. Variable itemIdSrc is assigned a value identifying the client data field 702 a.

The second line 804 of the code 360 uses the variable itemIdSrc, corresponding to client data field 702 a, to retrieve from the database 362 the value stored in column a of the client data 372. Variable itemIdProvided is assigned the value retrieved from the database 362.

The third line 806 of code 360 generates an online service query 384 using the value of itemIdProvided to supply the online service data field 704 input itemId. The generated online service query 384 is stored in the variable modelArtsRequestBody.

Thus, the code generator 358 receives the representation of the RESTful API provided by the online service 314 and the configuration data 379 and generates the code 360 to implement data field mapping. In some embodiments, there may be no need to re-generate the code 360 unless the interface contract 320 changes.

Returning to FIG. 6, at step 612 the code 360 is executed in response to the backend service 124 detecting a triggering condition. In various embodiments, different portions of the code 360 may be executed when different triggering conditions are detected by the backend service 124. These triggering conditions may, in various embodiments, include predefined events, database operations, or the receipt of communications or requests from the client application 312. The various different portions of the code 360 may therefore be executed at different times relative to each other depending on the configuration of the embodiment and the trigger conditions detected by the backend service 124. Triggering conditions used by various embodiments are described in greater detail below.

At step 614, the backend service 124 executes the code 360 to generate an online service query 384 and send the online service query 384 to the online service 314 to the online service 314. The online service query 384 may include online service data fields 704, such as the example input itemId illustrated in FIG. 8. In the example backend service 124 of FIG. 3, the backend service 124 executes the code 360 to generate the online service query 384 based at least in part on client data 376 retrieved from the database 362. For example, as described with reference to FIG. 8, the online service query 384 includes the input online service data field 704 itemId populated using client data 376 retrieved from column a of database table stored in the client database 362 (corresponding to client data field 702 a).

The code 360 in some embodiments includes programming logic, which is executed when the triggering condition is detected. The code 360 that includes programming logic, when executed by the backend service 124, generates and send online queries 384 to the online service 314 at step 614. The code 360 may specify the database operations which trigger execution of the code 360 to generate and send an online service query 384. This specification of database operations which trigger execution of the code 360 may be based on the mapping of data fields provided by the developer in the configuration data 379. For example, if the client data fields 702 *a* and *d* are mapped to online service data fields 704, then the programming logic of the code 360 may monitor the database table containing columns a and d for new rows or records saved to that table, or any rows in that table that have the values of columns a or d modified. Either of those events would constitute a triggering condition occurring, causing the code 360 to execute. Execution of the code 360 results in the code 360 generating the online service request 384 and sending the online service request 384 to the online service 314.

At step 616, the backend service 124 receives an online service response 386 from the online service 314. In the example described with reference to FIG. 8, the online service response 386 would include a data object containing an array with two elements: online service data fields 704 itemId and predict.

At step 618, the backend service 124 sends response data 377 to the client application database 362. However, as described below, other embodiments may send the response data 377 to different client data recipients. The response data 377 sent to the database 362 (or other client data recipients) is based at least in part on the contents of an online service response 386 received from the online service 314. Thus, in the example of FIG. 8, the online service response 386 provide values for the online service data fields 704 itemId and predict, mapped to client data fields 702 *a* and *d* respectively. While not shown in the snippet of the code 360 illustrated in FIG. 8, additional portions of the automatically generated code 360 could in some embodiments parse the online service response 386 and store the received values of itemId and predict in the client application database 362 columns a and d (corresponding to client data fields 702 *a* and *d*). The response data 377 being stored in the database 362 by the backend service 124 executing the code 360 thus be based on the online service response 386, and would be sent to database 362 (or other client data recipient).

In some embodiments, the response data 377 may be a flattened version of the online service response 386. For example, if the online service 314 sends a complex data objects as part of the online service response 386, these data objects may be reduced to their constituent online service data fields 704. An array or list of records sent by the online service 314 as part of the online service response 386 may be stored in the database 362 as rows in a database table based on the configuration data 379. Similarly, a complex data object sent by the online service 314 as part of the online service response 386, the backend service 126 may map attributes of the complex data object to columns in a database table based on the configuration data 379, with the values of those various attributes stored in a row of the database table.

In some embodiments, the UI module 356 communicates with the browser of the developer device 318 to present in the browser, one or more online services that are available for the client application 312 to use via the backend service 124. Identifying online services at step 602 may be carried out by consulting a local, remote, or distributed list of online services. The list may include an identifier associated with each respective online service and an indicator which indicates whether the backend service 124 is permitted to interact with each online service. The list may also provide descriptions of each available online service or other data or metadata to facilitate selection of one or more of the online services by the developer of the client application 312. The list may be constructed or filtered based on information about the client application 312 or other criteria.

In some embodiments, the UI module 356 of the backend service 124 sends online service option information to the developer device 318. In some embodiments, the online service option information includes the list of identified available online services. In some embodiments, the online service option information is generated by the introspection module 354 of the backend service 124 based on the list of identified available online services. The developer device 318 (e.g., the browser running on the developer device 318) interacts with the UI module 356 of the backend service 124 to receive the online service option information and to present the online service option information 380 in the browser running on the developer device 318. The online service option information is presented in the browser running on the developer device 118 in a way that facilitates or simplifies the selection of one or more of the online services by the software developer of the client application 312 using the developer device 318.

In some embodiments, the backend service 124 receives online service selection information from the developer device 318. The online service selection information identifies one or more of the available online services the client application 312 will use.

As noted above, the backend service 124 in the example embodiment of FIG. 3 may execute different portions of the code 360 in response to different triggering conditions. In various embodiments, the trigger condition is based on the database operation performed on the database 362. For example, the triggering condition may indicate that new data has been saved to a specific database table of the database 362, that data in the database table of the database 362 has been modified, or that data fields in the database need to be populated with data from the online service 314. The code 360, when executed by the backend service 124, generates the online service request 384 using client data 376 retrieved from rows of the database table that have been newly saved or modified as indicated by the triggering condition. In some embodiments, the code 360 may be associated with the database 362 as part of a save and trigger operation, with the trigger condition being detected by the backend service 124 when the data in the database changes.

The backend service 124 may therefore allow developers to work only with the data in the database 362 via APIs provided by the backend service 124, as would be normal for the software developer of the client application 312. The online service 314 is hidden from the software developer of the client application 312. Advantageously, the backend service 124 of the present disclosure eliminates the need for the software developer of the client application 312 to write any code to integrate the online service 314 with the backend service 124. This is because the code 360 for integrating the online service 314 with the backend service 124 is automatically generated by the backend service 124.

Alternative embodiments will now be described with reference to FIG. 4 and FIG. 5.

Figure 4:
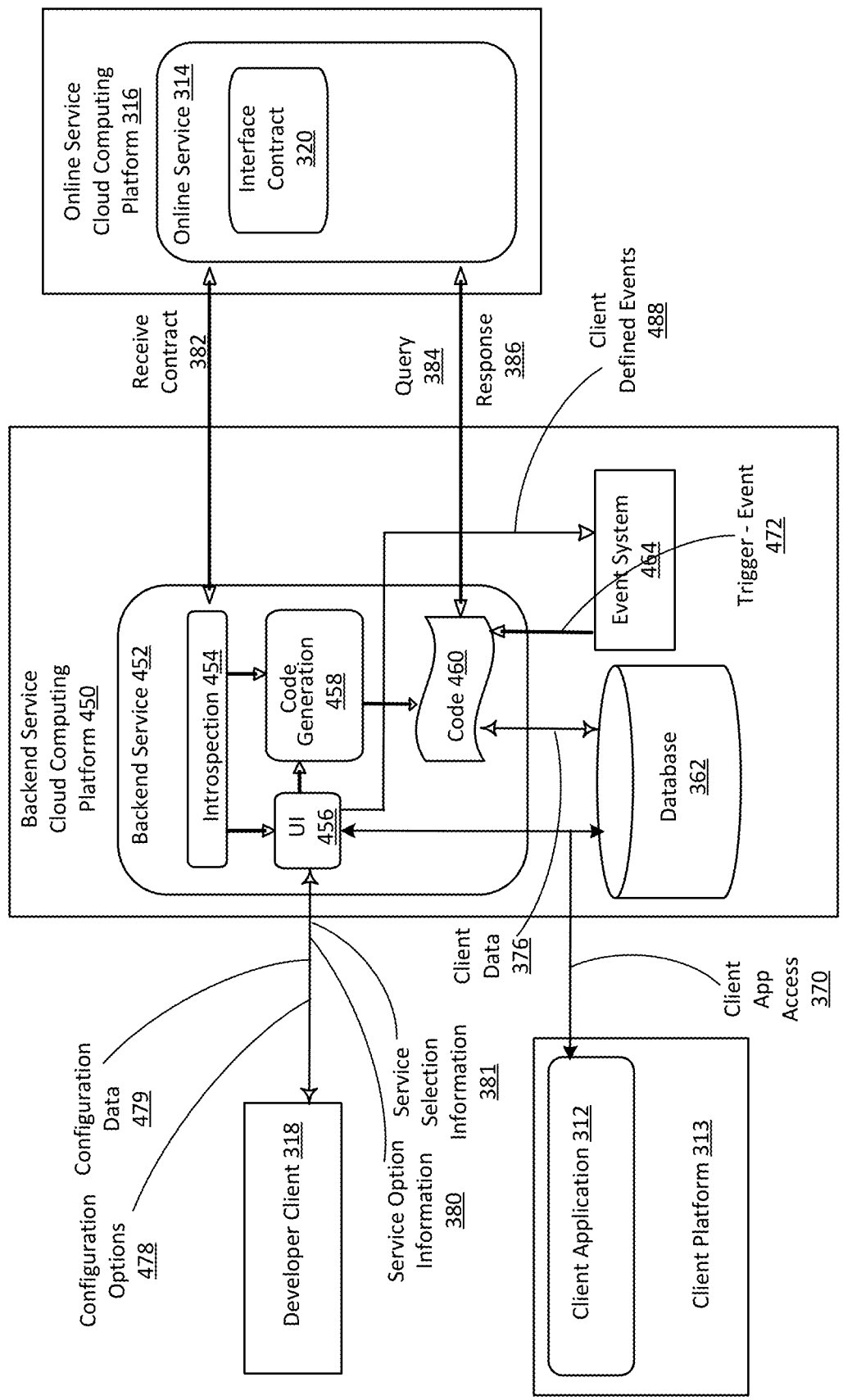
FIG. 4 is a block diagram of configuration of a client application accessing a cloud-based online service by means of a backend service with code triggered by an event in accordance with a second example embodiment of the present disclosure.

Referring to FIG. 4, a second embodiment of the backend service 124-1 hosted on the cloud computing platform 100 is shown. The backend service 124-1 includes an introspection module 354-1, a UI module 356-1, a code generation module 358-1, a database 362-1, and an event system 464. The introspection module 354-1, the UI module 356-1, and the database 362-1 are similar to the introspection module 354, the UI module 356, the code generation module 358, and the database 362 described in FIG. 3, and thus are not described in detail. The code generation module 358-1 is configured to generate code 360-1

The event system 464 is configured to provide trigger conditions which trigger (e.g., cause) execution of for the code 360-1. The introspection module 354-1, UI module 356-1, and code generation module 358-1 are all configured to make use of the event system 464 instead of, or in addition to, the use of database operations as trigger conditions which trigger (e.g., cause) execution of the code 360-1.

In the embodiment illustrated in FIG. 4, the trigger conditions determined based on events which may trigger execution of the code 460 (trigger-events 472 output by the event system 464). The events (e.g., trigger-events 472 output by the event system 464) may include client defined events 488 in some embodiments. These client defined events 488 may be defined by the software developer of the client application 312 as part of the configuration data 379-1 in response to event configuration options presented to the developer as part of the configuration options 378-1. Other trigger-events 472 used to trigger execution of the code 360-1 may be predefined by the backend service 124-1 without input from the software developer of the client application 312, potentially based on other variables such as the interface contract 320 of the online service 314 or the database operations performed on the database 362. An example of an event used to trigger execution of the code 360-1 in some embodiments is a system crash event. Upon detection of a system crash event, the code 460 might be executed to update all records in the database 362 that might have been corrupted or left incomplete by the system crash, re-populating those database fields using new online service requests 384 as needed. In a further example, the client application 312 is a security camera application, and the online service 314 is a facial recognition software provided as AI online service. When a camera captures a photograph of a person entering a secured area, this constitutes a trigger-event 472. A filepath to the captured photo is included in the online service request 384. The online service 314 applies a facial recognition model of the facial recognition software provided as AI online service to the photograph to check if the person is a known criminal or not.

Figure 5:
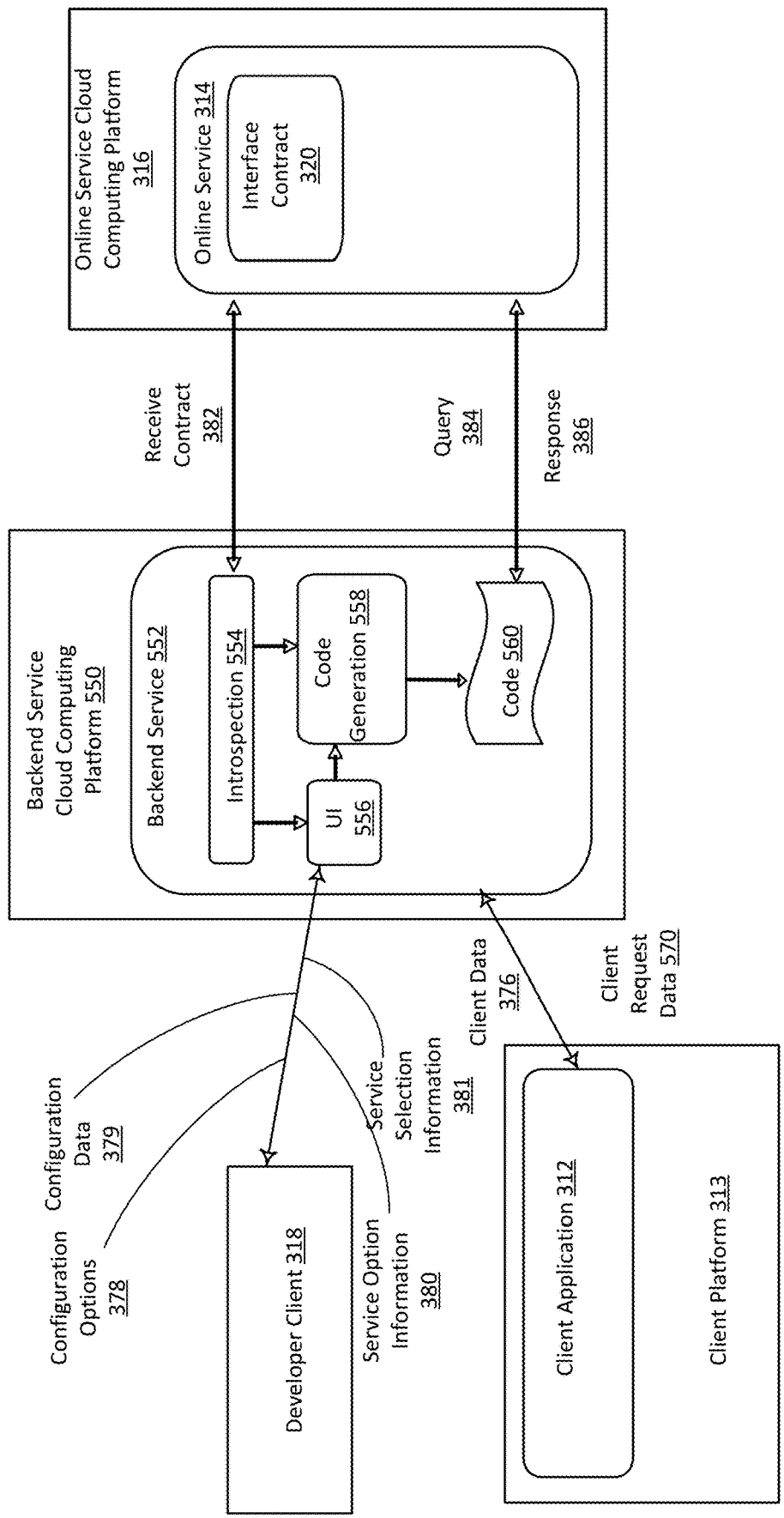
FIG. 5 is a block diagram of configuration of a client application accessing a cloud-based online service by means of a backend service with code triggered by receiving a client application request in accordance with a third example embodiment of the present disclosure.

Referring to FIG. 5, a third example embodiment of the backend service 124-2 is shown. This embodiment does not include the database 362 as part of the backend service 124-2. Instead, the backend service 124-2 passes query and response information back and forth between the client application 312 and the online service 314, using the code 360-2 to translate and filter the data fields of each respectively. The introspection module 354-2, UI module 356-2, and code generation module 358-2 are all configured accordingly. The configuration options 378 sent to the developer device 318 may include additional documentation on the RESTful APIs provided by the online service 314 to allow the developer of the client application 312 to code the necessary database access logic into the client application 312. In this embodiment, the trigger condition which triggers execution of the code 360-2 by the backend service 124-2 may be the receipt of client request data 570 from the client application 312. The online service request 384 is constructed at least in part based on the client request data 570. Furthermore, in this embodiment, instead of the client data recipient being a database, the client data recipient is the client application 312.

The backend services 124, 124-1 enables the software developer of the client application 312 to configure a relationship between the database 362 and the inputs and outputs of the online services 314 without the need to write any code. The backend services 124, 124-1 automatically generates code 360, 360-2 that integrates access to the online service 314 into the backend services 124, 124-1 in order to enable the client application 312 to access the online service 314 using a non-standardized HTTP-based RESTful API provided by the online service. Access to the online services 314 is provided to the client application 312 by the software code 360-1, 360-2 of the backend service 124, 124-1. The software code 360-1, 360-2, when executed by the backend service 124-1, 124-2, enables the client application 312 to interact with the backend service 124 and access the online service 314 using a non-standardized HTTP-based RESTful API provided by the online service 314. This eliminates the need for the software developer of the client application 312 to write specialized software code as part of the client application 312 to interface with the non-standardized RESTful APIs of the online service 314. Instead, the client application 312 only needs to communicate with the database 362 of the backend service 124, 124-1.

The backend service 124-2 enables access to the online service 314 by the client application 312 by allowing the software developer of the client application 312 to configure a single API of the backend service 124-2 instead of writing software code to interface with the one or more non-standardized RESTful APIs provided the online service 314. The backend service 124-2 automatically generates code 360-2 which enables the client application 312 to access the online service 314 based on the developer's configuration options selected by the software developer of the client application 312 and executes the code 360-2 during runtime as needed. Access to the online service 314 by the client application 312 is thus enabled by the code 360-2 of the backend service 124-2. This eliminates the need to write specialized software code as part of the client application 312 to interface with the non-standardized RESTful APIs provided by the online service 314. Instead, the client application 312 only needs to be able to communicate with the single, configured API of the backend service 124-2.

The various embodiments above are described as using cloud computing platform 100 to deploy or host the backend service 124, 124-1, 124-2 and a server to host the online service 314. In some embodiments, the online service 314 may be hosted on a network server, a compute cluster, another cloud computing platform, or other network-connected computer.

The client application 312 is described as a software application that is hosted or running on a computing device (e.g., the client device 313) that is in communication with the backend services 124, 124-1, 124-2 via a communication network. In some embodiments, the client device 313 that hosts or runs the client application 312 may be a personal computer, a smart phone or other mobile electronic device, a server. In some embodiments, the client application may be a software-as-a-service (Saas) hosted on the same cloud computing platform 100 as the backend services 124, 124-1, 124-2.

Communication between the backend services 124, 124-1, 124-, the client device 313, the developer device 318, or the online service 314 may vary between different embodiments. Such communication may be via a communication bus where one or more of the communicating components may be implemented on the same physical computer as the component it communicates with. The communication may occur by a communication link, such as a wired or wireless digital communication link, and may take place via one or more intermediaries or via a communication network such as the Internet.

The steps and operations in the flowcharts and drawings described herein are for purposes of example only. There may be many variations to these steps and operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method, comprising:
   receiving, by a backend service, an interface contract from an online service;
   sending, by the backend service to a developer device, configuration options determined based on an introspection of the interface contract;
   receiving, by the backend service, configuration data from the developer device;
   generating, by a backend service, software code comprising executable instructions based on the introspection of the interface contract and the configuration data; and
   in response to detecting a triggering condition, executing, by the backend service, the executable instructions of the software code to:
      send an online service query to the online service;
      receive an online service response from the online service; and
      send response data to a client data recipient, the response data being based at least in part on the online service response.

2. The method of claim 1, wherein the response data is a flattened version of the online service response.

3. The method of claim 1, wherein the configuration options comprise a plurality of options for mapping one or more client data fields of the response data to one or more online service data fields of the online service.

4. The method of claim 3, wherein the configuration data comprises a map of the one or more client data fields of the response data to the one or more online service data fields of the online service.

5. The method of claim 1, wherein the client data recipient is a database.

6. The method of claim 5, wherein the online service query sent to the online service is based at least in part on client data retrieved from the database.

7. The method of claim 6, wherein the trigger condition is based at least in part on a database operation performed on the database.

8. The method of claim 6, wherein the trigger condition is based at least in part on an event.

9. The method of claim 8, wherein the event is based at least in part on the configuration data.

10. The method of claim 1, wherein the client data recipient is a client application.

11. The method of claim 10, wherein the online service query sent to the online service is based at least in part on data received from the client application.

12. The method of claim 1, wherein the online service comprises an artificial intelligence online service.

13. The method of claim 1, wherein the online service provides a representational state transfer (REST) application program interface (API), and wherein the software code enables a client application to interact with the backend service to access an online service using the REST API.

14. A non-transitory computer-readable medium comprising instructions which, when executed by a machine, cause the machine to perform the method of claim 1.

* * * * *